Aug. 25, 1931.  E. P. ENGSTROM  1,820,695
TRACTION DEVICE
Filed June 4, 1928
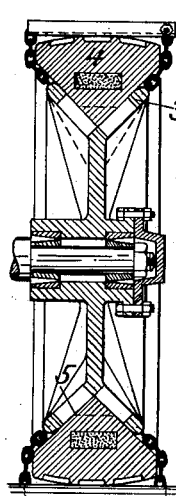
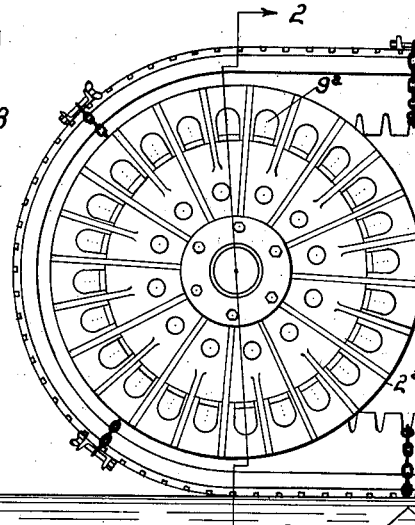
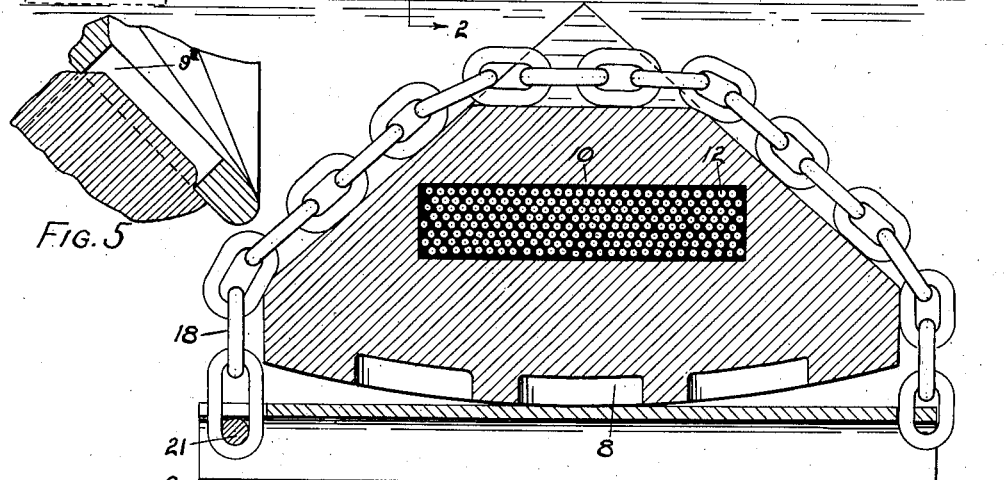
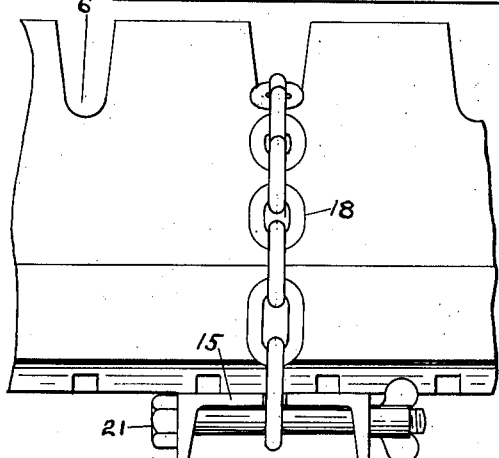
INVENTOR.
ERNEST P. ENGSTROM
BY Ely & Barrow
ATTORNEYS Patented Aug. 25, 1931

1,820,695

UNITED STATES PATENT OFFICE

ERNEST P. ENGSTROM, OF AKRON, OHIO, ASSIGNOR TO THE McNEIL BOILER COMPANY, OF AKRON, OHIO, A CORPORATION OF OHIO

TRACTION DEVICE

Application filed June 4, 1928. Serial No. 282,551.

This invention relates to traction devices for trucks or other heavy vehicles and particularly to that type of traction device in which the usual wheels of the truck are replaced by a driving unit, which comprises pairs of wheels having heavy rubber belts which form the supporting and driving surface of the unit. These traction devices are designed especially for use in road or other building, excavating and filling operations where the trucks are required to go over loose dirt and mud. The rubber belt or tread member is, under normal conditions, capable of supporting and driving the trucks, but under extremely difficult conditions the traction obtained through the tread members is sometimes ineffective, and it is an object of the present invention to provide an attachment to be used in combination with the tread or traction member for increasing the tractive effect of the apparatus.

Another object of the invention is to improve upon the driving connection between the power wheel of the tractor and the belt.

In the drawings is shown one form of traction device in combination with the tread member, which has been found to operate in a highly satisfactory manner, and also one embodiment of the improved driving connection, it being understood that changes or modifications may be made therein within the scope of the invention as set forth in the claim.

In the drawings,

Figure 1 is a side elevation of a complete traction unit, showing the traction devices in position thereon;

Figure 2 is a section on the line 2—2 of Figure 1;

Figure 3 is an enlarged cross-section through the tread or traction band;

Figure 4 is a side elevation of the parts shown in Figure 3; and

Figure 5 is an enlarged detail illustrating the improved driving connection between the power wheel and belt.

The device comprises a pair of wheels $2^a$ and $2^b$ which are designed to be substituted for a driving wheel on the truck, these wheels being usually supported upon a subframe beneath the vehicle body and being so mounted as to permit approach of the wheels upon flexing of the driving belt. The details of the subframe or other mounting of the wheels are not shown, as they have no bearing upon the present device which may be mounted upon and in combination with various forms of traction units. One wheel $2^a$ of each pair is driven from the truck drive.

The wheels, which are illustrated herein, are provided with V-shaped grooves 3 in their outer peripheries, and in the grooves is seated the endless traction belt 4 having sloping inner surfaces 5 which fit within the grooves and shed the dirt which would otherwise accumulate upon the surface of the belt. The belt is composed of a tough, resilient rubber of the composition usually employed for treads of pneumatic tires. In order to facilitate the passage of the belt about the wheels, its inner perimeter is provided with a series of spaced notches or recesses 6 and the outer surface of the belt is formed with suitable non-skid formations 8 which increase the tractive power of the belt. The outer surface of the belt or tread is slightly rounded as shown. The wheels are provided with openings $9^a$ and $9^b$ to permit the passage of dirt. The belt is maintained at its proper length by a reinforcing element 10 located at approximately the median plane of the belt where the action is neutral or so limited as to eliminate the tendency of the reinforcing member to separate from the body of the traction member. This reinforcing member, in its preferred form, is composed of a plurality of cords 12 arranged in layers and extending longitudinally of the belt, the mass of cords being embedded in a coating or casing of high grade rubber of the composition usually employed for cushion stocks in pneumatic tires.

The wheel openings $9^a$ in wheel $2^a$ are preferably extended substantially to the vertex of the groove 3 in wheel $2^a$ as appears in Figures 2 and 5 whereby the rubber of the belt when under compression expands into the openings 9ᵃ as illustrated forming in effect, cogs of rubber engaged in openings 9ᵃ and providing a more positive driving connection between wheels 2ᵃ and the belts.

The traction device, which is to be used in combination with the tread member, consists of a metal plate 15 having longitudinal flanges 16 extending across the tire, this plate being held in place by a tie member, preferably comprising a flexible chain 18, the ends of which are secured to the plate and which pass snugly about the belt conforming to the contour thereof. In mounting the traction device on the tread member, the chain is engaged within the notches 6 on the inner periphery of the tread, which thereby prevents travel of the traction device about the tread. One end of the chain is permanently attached to the cross plate in any suitable way. The other end of the chain is releasably secured to the plate by a bolt 21. Any desired number of these traction devices may be distributed about the tread member. By the use of the device described, the traction attachments may be secured upon the tread without jacking up the vehicle, so that the devices may be applied while the truck is on its location, so that if the truck is stalled, it can be easily started after the application of the traction attachments. When moving over a pavement the traction attachments are removed. In passing around the wheels, the tie members will be embedded in the body of the belt.

What is claimed is:

In a traction unit, the combination of a driver and an idler wheel having V-shaped outer grooved peripheries, the walls of the grooves of the driving wheel having slot-like apertures extending from the vertex of the groove half-way up the sides thereof, a flexible belt over the wheels and seated in the grooves therein, a traction plate upon the outer surface of the belt, said plate having upstanding portions adapted to enter the ground, a tie member passing around the belt and secured to the plate, said tie member cooperating with said slot-like apertures to assist in non-slipping drive, and means to prevent travel of the traction plate on the belt, comprising notches on the inner periphery of the belt which engage a section of the tie member.

ERNEST P. ENGSTROM.